United States Patent [19]
Rockenfeller et al.

[11] Patent Number: 5,165,247
[45] Date of Patent: Nov. 24, 1992

[54] REFRIGERANT RECYCLING SYSTEM

[75] Inventors: Uwe Rockenfeller; Lance D. Kirol, both of Boulder City, Nev.

[73] Assignee: Rocky Research, Boulder City, Nev.

[21] Appl. No.: 653,768

[22] Filed: Feb. 11, 1991

[51] Int. Cl.$^5$ .................... F28D 7/00; F28D 17/00
[52] U.S. Cl. ........................... 62/77; 55/70; 55/74; 55/208; 165/104.12; 62/475; 62/480; 62/112
[58] Field of Search ................. 62/101, 106, 480, 112, 62/4, 292, 77, 272, 475; 165/104.12; 55/25, 28, 70, 74, 208

[56] References Cited

U.S. PATENT DOCUMENTS

| | | | |
|---|---|---|---|
| 2,384,460 | 9/1945 | Kleen | 62/480 |
| 4,674,563 | 6/1987 | Maier-Laxhuber et al. | 165/104.12 |
| 4,709,558 | 12/1987 | Matsushita | 62/480 |
| 4,801,308 | 1/1989 | Keefer | 55/25 |
| 4,822,391 | 4/1989 | Rockenfeller | 62/12 |
| 4,848,994 | 7/1989 | Rockenfeller | 62/4 |
| 4,944,159 | 7/1990 | Crozat | 62/112 |
| 4,976,117 | 12/1990 | Crozat | 62/480 |

FOREIGN PATENT DOCUMENTS

| | | | |
|---|---|---|---|
| 0068448 | 6/1978 | Japan | 165/104.12 |
| 0125183 | 9/1979 | Japan | 55/208 |

Primary Examiner—Albert J. Makay
Assistant Examiner—William C. Doerrler
Attorney, Agent, or Firm—Jerry R. Seiler

[57] ABSTRACT

The invention disclosed herein relates to an apparatus for being detachably connected to a chemical or refrigeration system for selectively receiving and dispensing a gaseous refrigerant or chemical from and to that system, respectively, including a vessel having a chamber capable of maintaining a pressurized gas therein, gas inlet means for directing the gas to and from the chamber, and connection means for connecting the gas inlet to a refrigeration or chemical system; a plurality of heat exchange conduits exposed in the chamber for directing heat exchange fluid therethrough and fluid inlet and outlet means communicating exteriorly of the vessel for directing the fluid to and from the conduits, respectively; and a solid adsorbent capable of alternately adsorbing and desorbing the gaseous refrigerant or chemical and positioned in thermal communication with each of the heat exchange conduits.

31 Claims, 1 Drawing Sheet

5,165,247

REFRIGERANT RECYCLING SYSTEM

BACKGROUND OF THE INVENTION

The collection or capture of gaseous refrigerants to be evacuated from refrigeration systems is often not practiced due tot he lack of suitable available commercial equipment or convenient methods. Although the use of fluorocarbon or CFC refrigerants are intended to be gradually phased out because of atmospheric and environmental pollution, even with the use of other gaseous refrigerants including hydrogen, nitrogen or polarized gaseous refrigerants such as ammonia, water, methanol, methylamine, sulfur dioxide, and the like, release of such materials into the atmosphere is environmentally and economically undesirable and may be prohibited by law. Similarly, the temporary evacuation or purging of toxic gases from chemical systems to avoid atmospheric pollution, or to prevent the loss of valuable or expensive gases, are of substantial interest, but practical systems for such uses are not presently available.

SUMMARY OF THE INVENTION

The system of the present invention is directed to an apparatus for being permanently or selectively installed with a refrigeration or chemical system whereby a gas may be evacuated from the system and adsorbed on a solid adsorbent material, and later desorbed and returned t the system, if and when desired. In one embodiment, the invention comprises a portable system incorporating a pressure holding vessel for adsorbing the gas therein and includes means for selectively desorbing the gas for return to the refrigeration or chemical system. In another embodiment, the invention comprises a vessel having the gas adsorbing and desorbing capability which may be permanently installed with a system for selectively capturing the as and for returning it to the system when desired.

The advantages of a system and apparatus of the present invention include providing means for evacuating the gas from a refrigeration or chemical system, for example, when a leak is detected or during repair or modification of the system during which removal of the gas is desired. Such evacuation may be initiated automatically utilizing suitable monitoring and valve engaging means, or accomplished manually. These, as well as other features and advantages of the invention, will be evident from the following detailed description.

DETAILED DESCRIPTION OF THE INVENTION

Figure 1:
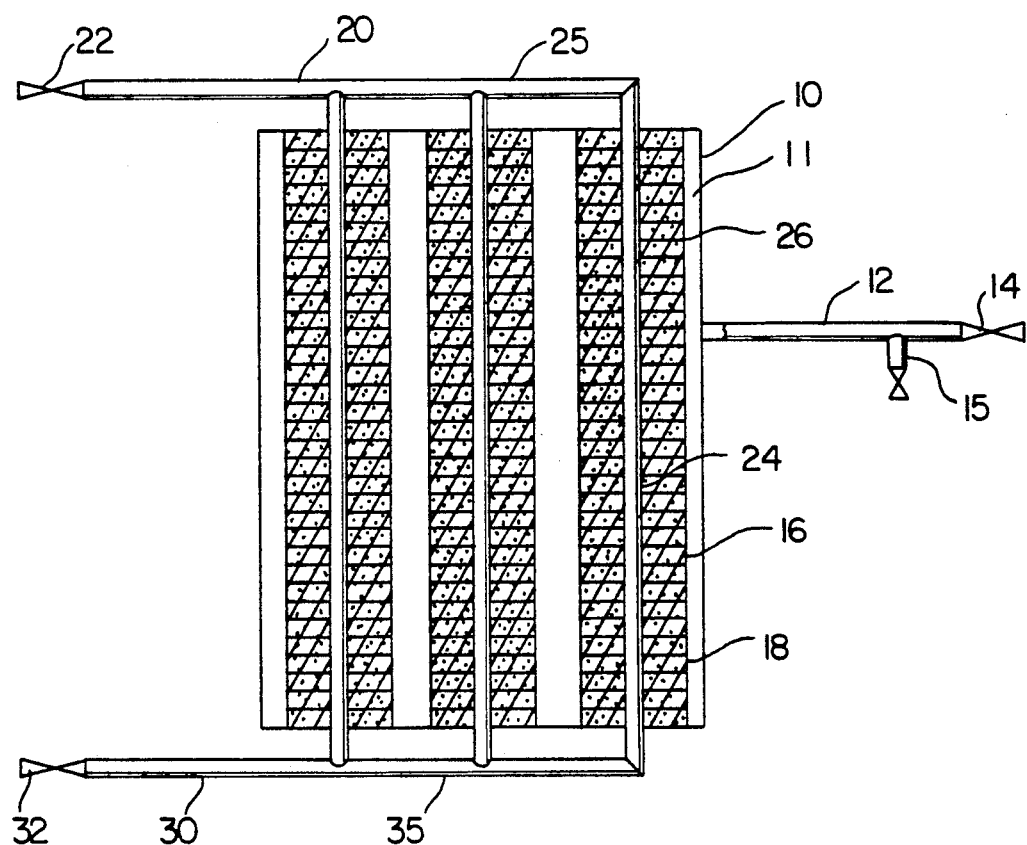
FIG. 1 is a schematic view of the interior of an apparatus according to the invention illustrating components and features thereof.

Although the present invention will be primarily described for the capture of gaseous refrigerants, particularly polarized gases, and especially ammonia, from refrigeration systems, it is to be understood that it may be useful in broader applications, as will be explained hereinafter. Referring to FIG. 1, there is shown a schematic illustration of the components and features of an apparatus of the invention. The vessel 10 defines an interior chamber 11 capable of maintaining a pressurized gas. Within the interior chamber are a plurality of conduits or pipes 24 which extend exteriorly of the vessel to be connected to a source of heat exchange fluid, typically water. Any number of interior pipes may be used, depending on the size of the vessel, with the latter being of a number and size depending on the amount of refrigerant gas which is to be received and adsorbed when the system is used. The plurality of heat exchange pipes 24 are secured to a common inlet header or manifold 25 which may be interior or exterior to the vessel wall 10. Secured to header 25 is an inlet pipe 20 and valve 22 for being attached to a source of heat exchange fluid. The inclusion of valve 22 on the inlet line is optional, and instead, a coupling or connection means for simply securing the inlet pipe to a source of hot or cold water, which source is usually valved, is also suitable. Each of the heat exchange pipes is also connected to an outlet header or manifold 35 interiorly or outside of the vessel walls. The manifold is connected to an exterior pipe or outlet line 30, which also may be provided with a valve 32.

A refrigerant gas inlet pipe 12, which also may have a valve 14 and/or coupling means for securing the inlet pipe to a refrigeration system line or conduit, extends exteriorly of the vessel 10 and provides the passageway for introducing and discharging a gaseous refrigerant to and from the apparatus. The refrigerant gas inlet pipe 12 communicates with the interior chamber 11 of the vessel 10 so that the refrigerant gas may be directly introduced into the vessel when the valve or connection means is tapped into a gas line of a refrigeration system. Also shown extending from inlet pipe 12 is an accessory conduit or nipple 15, which may be provided with a valve or other shut-off means, for securing a pressure line from a pump or compressor. Although an accessory compressor or pump or other source of pressurizing the vessel may be installed as component of the apparatus, it is an optional feature since it may not be necessary to utilize pressure or suction assist where the refrigeration system to which the apparatus is connected has sufficient compressor capacity or where sufficiently high temperature heat can be supplied to the vessel to raise the temperature.

Figure 2:
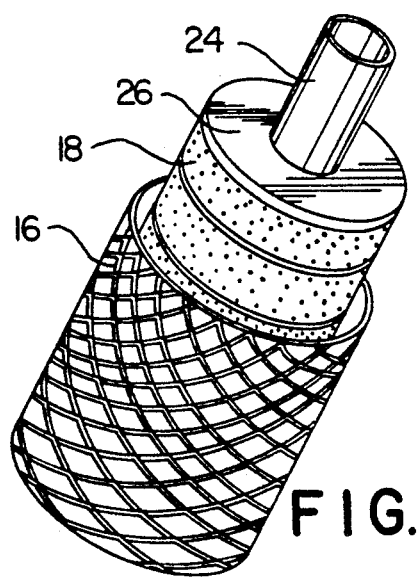
FIG. 2 is a partial view of an example of a heat exchange conduit as used in the apparatus with solid adsorbent disposed in heat exchange relationship with the conduit.

Secured in heat exchange communication with each of the pipes 24 is solid adsorbent 18 capable of alternately adsorbing and desorbing gaseous refrigerant. The solid adsorbent is preferably fixed or positioned around and in contact with the heat exchange pipes as disclosed in copending application Ser. No. 07/320,652 filed Mar. 8, 1989, the description of which is incorporated herein by reference. Preferably, the pipes include heat transfer projections in the form of plates, fins, trays, or the like extending from and preferably attached along the length of each of the heat exchange pipes for improving heat exchange between the heat exchange fluid passing through the pipes and the adsorbent material. Extending around the exterior of the solid adsorbent is a barrier 16 for retaining the solid adsorbent particles or mass in place around the pipes and in contact with the heat exchange plates or surfaces. It is important that this barrier material be porous to allow the passage of the gaseous refrigerant to and from the adsorbent. For this purpose, the barrier material may be wire mesh, porous foam or refractory material, inert fabric, and the like. An example of the heat exchange pipes on the interior of the apparatus is illustrated in FIG. 2, showing a heat exchange pipe having a plurality of fins 26 extending therearound, with solid adsorbent 18 located between the fins and further surrounded by a mesh or gaseous permeable fabric 16. The embodiment shown is only one example of such a construction, and other ways and means for designing the shape of the heat exchange pipes within the interior of the apparatus and for positioning the solid adsorbent and heat exchange communication with the pipes in such a manner that the gaseous refrigerant introduced into the vessel is readily exposed to the adsorbent may be used within the purview of the invention for achieving the desired purpose and results.

The specific solid adsorbent or adsorbents used within the apparatus will depend on the nature of the gas to be received and adsorbed. Where polar gases such as ammonia, water, sulfur dioxide, lower alkanols, alkylamines, polyamines or phosphine are to be received, preferred solid adsorbents include metal oxides, halides, carbonates, nitrates, nitrites, sulfates, oxalates, or sulfides capable of forming coordinative bonds with the refrigerant. Particularly suitable for such solid adsorbents are those in which the metal of the salt is selected from the group consisting of alkali or alkaline earth metals, transition metals, aluminum, zinc, cadmium or tin. Preferred adsorbents are capable of adsorbing gaseous refrigerant at between about $-30°$ C. and about $60°$ C., and can adsorb an amount of refrigerant corresponding to at least about 25% of the weight of the compound.

Of particular interest are the solid adsorbents for creating complex compounds for use with ammonia refrigeration systems. For that purpose, the solid adsorbent salts and complex compounds disclosed in U.S. Pat. No. 4,848,944, the description of which is incorporated herein by reference, are particularly desirable. Within those groups, the preferred complex compounds comprise chlorides, bromides, sulfates and chlorates of metals selected from the group consisting of alkali and alkaline earth metals, chromium, manganese, iron, cobalt, nickel, cadmium, tantalum, and rhenium or double metal chloride salts. The preferred ammonia/salt complex compounds are those having an equilibrium temperature at 1 bar pressure at least $20°$ C. higher than the ammonia equilibrium temperature, and not greater than about $160°$ C. Most preferred ammoniated complex compounds used in the apparatus of the invention are those selected from the group consisting of $CaCl_2.4-8$ ($NH_3$), $SrCl_2.1-8$ ($NH_3$), $CaBr_2.2-6$ ($NH_3$), $SrBr_2.0-8$ ($NH_3$), and $LiCl.0-3$ ($NH_3$). Mixtures of these compounds may also be used. The solid adsorbent composition may also comprise a mixture of the complex compound and a solid inert material such as pumice, alumina silica, porous metal granulates, etc., especially porous and highly thermally conductive materials.

Where non-polar gases are to be adsorbed, zeolites or activated carbon may be used. Metal hydrides are useful for the adsorption of hydrogen used in certain refrigeration and chemical systems known in the art.

In operating a method utilizing the apparatus of the invention for receiving a gaseous refrigerant from a refrigeration system in which the refrigerant is to be withdrawn, for example, when necessary for repairs to the refrigeration system or its equipment, compressors, pumps, lines, and the like, the inlet pipe 12 and connector means 14 is connected to the refrigerant loop system at any suitable point, the heat exchange fluid inlet pipe 20 connected to a source of cooling heat exchange fluid, for example, water, and the outlet pipe 30 connected to a heat exchange fluid discharge receiving means or drain. After the cooling heat exchange fluid has been passed through the heat exchange pipes for a time sufficient to cool the solid adsorbent to the desired temperature, valve 14 or other means for communicating the refrigeration system line to the gas inlet line 12 is opened. Because the adsorption reaction of the gaseous refrigerant with the solid adsorbent is exothermic, it is necessary or preferred to maintain an approximately constant temperature of the solid adsorbent during the time that the gaseous reactant is being introduced and adsorbed. By way of example, where ammonia is to be adsorbed on a solid adsorbent, for example, $SrCl_2$, cooling fluid temperature ranges of between about $0°$ C. and about $25°$ C. at atmospheric pressure are used. The pressure within the adsorbent vessel may be adjusted as desired using the compressor of the refrigerant system being evacuated, or using an accessory compressor as previously described, or both. It will be understood that during adsorption, higher pressures will decrease the time requirements needed for adsorbing the gaseous refrigerant. The pressure of refrigerant systems encountered are typically between about 0.2 and about 20 bars, and often around 3 bars. During the adsorption, the pressure of the refrigerant in the system is reduced as adsorption occurs.

After the refrigerant has been effectively evacuated, the valve means between the refrigeration system and the apparatus of the invention is closed, flow of heat exchange fluid into the apparatus terminated, and if desired, the apparatus may be disconnected. Thereafter, the apparatus may be stored with the refrigerant gas adsorbed on the solid adsorbent until it is desired to be recharged into the system from which it was removed or charged into another system.

When recharging of a refrigerant system is desired, the gas refrigerant inlet line 12 of the apparatus is secured into the refrigerant system line where desired, while heat exchange fluid is introduced into the heat exchange pipes of the apparatus. During this phase of using the apparatus, the adsorbed refrigerant, is desorbed from the solid adsorbent by heating the solid adsorbent, thereby increasing the vapor pressure of the adsorbed gaseous refrigerant. If desired, the rate of the endothermic desorption reaction may be increased by reducing the pressure in the chamber of the vessel, for example, by pulling a suction on gas pipe 12 utilizing the vacuum side of an accessory compressor and/or the suction may be pulled from the compressor of the refrigeration system in which the gaseous refrigerant is being introduced. Again, constant temperatures of the heating fluid for desorbing the gaseous refrigerant is preferred. In an example using ammonia adsorbed on $SrCl_2$, desorption temperatures of the heat exchange fluid and solid adsorbent between about $5°$ C. and about $150°$ C. and preferably about $30°$ C. and about $125°$ C. are suitable. The use of a compressor for creating a suction in the line during the feedback of the gas into the refrigerant loop may not be required, although it should be understood that the lower the system pressure during desorption, the faster the rate of desorption.

It has been found utilizing apparatus according to the invention for ammonia adsorption and desorption with $SrCl_2$ as the solid adsorbent, depending on pressure and temperature conditions, each adsorption and desorption phase can be completed in between about 15 minutes and about 2 hours. Again, lower cooling temperatures during adsorption and higher heating temperatures during desorption accelerate the reaction to provide faster and more dramatic pull-down, or faster and higher pressure ammonia recycling, respectively. Of course, the heating and cooling of the solid adsorbent bed of the apparatus will depend on the temperature of the heat exchange fluid available at the site.

It is also within the purview of the invention that the apparatus be portable, where desired or otherwise convenient so that it may be moved to different refrigeration equipment or chemical sites for being connected to evacuate refrigeration or chemical loops as it is needed. For example, portable systems incorporating reactors capable of adsorbing up to 1,000 lbs. of refrigerant may be especially useful. In other locations, especially where very large gas containing systems are installed, it may be preferred to permanently locate such an apparatus for evacuating and recharging (recycling), whereby the apparatus of the invention need not be portable or moveable to any substantial extent. It may also be desirable to incorporate a gas detector with the system such that adsorption may be triggered by monitoring the atmosphere adjacent the refrigeration system for indicating a leak and by removal of gas where such a leak is detected. Such equipment may include valves automatically actuated in response to a detected gas leak for initiating a cool water supply into the heat exchange conduit of the apparatus and for opening the valve to begin withdrawing the gas, as previously described. Such equipment may be especially useful where injury to humans or expensive damage to products or materials could result in the event of significant exposure to leaking gases. These, as well as other modifications and advantages of the components of the invention and uses thereof, will be evident to those skilled in the art.

What is claimed is:

1. Apparatus for being detachably connected to a system containing a refrigerant and capable of selectively evacuating said refrigerant in a gaseous state from said system, storing said refrigerant for a selected time, and selectively charging said refrigerant to said system, respectively, comprising:

a vessel having a chamber capable of maintaining a pressurized gas therein, gas inlet means for directing gaseous refrigerant to and from said chamber, and connection means for connecting said gas inlet to a refrigeration system containing said refrigerant, a solid adsorbent capable of alternatively adsorbing and desorbing said gaseous refrigerant, and a plurality of heat exchange conduits exposed in said chamber for directing heat exchange fluid therethrough substantially all of said conduits having solid adsorbent secured thereon whereby said refrigerant may be adsorbed along substantially all of said conduits, and fluid inlet and outlet means communicating exteriorly of said vessel for directing said heat exchange fluid to and from substantially all said conduits during said adsorption, and for directing a heat exchange fluid having a second temperature to and from substantially all said conduits during said desorption.

2. Apparatus of claim 1 wherein heat exchange fluid for adsorption is at a first temperature and for desorption is at a second temperature.

3. Apparatus capable of receiving a polar refrigerant from a system containing said polar refrigerant, storing said polar refrigerant for a selected time, and selectively dispensing said polar refrigerant to said system comprising:

a vessel having a pressure sealed chamber and gas inlet means for being connected to said system containing said polar refrigerant, a solid adsorbent salt capable of forming a complex coordinated compound with said polar refrigerant, which compound is capable of adsorbing at least 25% of said polar refrigerant, by weight, of said compound, and heat exchange means exposed in said sealed chamber comprising a plurality of heat exchange conduits substantially all of said conduits having said solid adsorbent secured thereon whereby said polar refrigerant may be adsorbed along substantially all of said conduits, a fluid inlet and a fluid outlet, said fluid inlet including means for being connected to a fluid supply source for directing a heat exchange fluid through substantially all said conduits for adsorbing said polar refrigerant, and for directing a heat exchange fluid through substantially all of said conduits for desorbing said polar refrigerant.

4. Apparatus of claim 3, wherein said heat exchange fluid for adsorbing said polar refrigerant has a relatively low temperature, and said heat exchange fluid for desorbing said polar refrigerant has a relatively high temperature.

5. A method of removing a gas from a refrigeration system having a gas line and pressurized with said gas, utilizing an apparatus comprising a vessel having a chamber capable of maintaining a pressurized gas therein, gas inlet means for directing gaseous refrigerant to and from said chamber, and connection means for connecting said gas inlet to a refrigerant system containing said refrigerant, a solid adsorbent capable of alternatively adsorbing and desorbing said gaseous refrigerant and secured in heat exchange communication with a plurality of heat exchange conduits, and a plurality of heat exchange conduits exposed in said chamber for directing heat exchange fluid therethrough and fluid inlet and outlet means communicating exteriorly of said vessel for directing said heat exchange fluid to and from said conduits during said adsorption and said desorption, said method comprising:

connecting said gas inlet means of said apparatus to a gas line of said system, connecting the fluid inlet means of said apparatus to a source of cooling fluid having a temperature between about $-30°$ C. and about $60°$ C., and concurrently introducing said gas from said system into said chamber of said apparatus while directing said cooling fluid through said heat exchange conduits, and adsorbing said gas on the solid adsorbent in an exothermic adsorption reaction while continuing to direct cooling fluid through said heat exchange conduits.

6. A method of removing ammonia refrigerant from a refrigeration system utilizing an apparatus comprising a vessel having a pressure sealed chamber and gas inlet means for being connected to said system containing said ammonia, a solid adsorbent salt capable of forming a complex coordinated compound with said ammonia, which compound is capable of adsorbing at least 25% ammonia, by weight, of said compound, and wherein said salt is secured in heat exchange communication with the exterior of each of a plurality of heat exchange conduits, and heat exchange means exposed in said sealed chamber comprising a plurality of heat exchange conduits and having a fluid inlet and a fluid outlet, said fluid inlet including means for being connected to a fluid supply source for directing a heat exchange fluid through said conduits, said method comprising:

feeding ammonia from said refrigeration system to the sealed chamber of said apparatus and concurrently supplying cooling fluid at a temperature of between about $-30°$ C. and about 60° C. through the heat exchange conduits of said apparatus whereby said ammonia is adsorbed on said salt in an exothermic reaction, continuing to supply cooling fluid through said heat exchange conduits while feeding ammonia into said pressure sealed chamber, and selectively terminating said ammonia removal by disconnecting communication between said sealed chamber and said refrigeration system and terminating the supply of cooling fluid through said heat exchange conduits of said apparatus.

7. A method of supply a polar refrigerant to a refrigeration system utilizing an apparatus comprising a vessel having a pressure sealed chamber, gas outlet means for directing polar refrigerant from said chamber, connection means for connecting said gas outlet to a refrigeration system, a complex compound comprising a reaction product of said polar refrigerant and a metal salt capable of alternately adsorbing and desorbing said polar refrigerant thereon, said complex compound secured in heat exchange communication with a plurality of heat exchange conduits exposed in said chamber for directing heat exchange fluid therethrough, and fluid inlet and outlet means communicating exteriorly of said vessel for directing said heat exchange fluid to and from said conduits, said method comprising:

connecting said gas inlet means of said apparatus with said refrigeration system, connecting the fluid inlet means of said apparatus to a source of heat exchange fluid having a temperature sufficient to induce desorption of said polar refrigerant from said complex compound, directing said heat exchange fluid through said heat exchange conduits to desorb said polar refrigerant from said complex compound, and directing said desorbed polar refrigerant to said refrigeration system.

8. A method of supplying a refrigeration system with a refrigerant in a gaseous state, utilizing an apparatus comprising a vessel having a chamber capable of maintaining a pressurized gas therein, gas inlet means for directing gaseous refrigerant to and from said chamber, and connection means for connecting said gas inlet to a refrigeration system, a solid adsorbent capable of alternatively adsorbing and desorbing said gaseous refrigerant and secured in heat exchange communication with a plurality of heat exchange conduits, said solid adsorbent having said refrigerant adsorbed thereon and capable of being desorbed therefrom, and a plurality of heat exchange conduits exposed in said chamber for directing heat exchange fluid therethrough, and fluid inlet and outlet means communicating exteriorly of said vessel for directing said heat exchange fluid to and from said conduits, said method comprising:

connecting the fluid inlet means of said apparatus to a source of heating fluid having a temperature sufficient to induce desorption of said refrigerant in a gaseous state from said solid adsorbent, connecting the gas inlet means of said apparatus with a gas line of said refrigeration system, directing said heating fluid through said heat exchange conduits to desorb said refrigerant from said solid adsorbent, and supplying said desorbed refrigerant to said refrigeration system.

9. Apparatus of claim 1, wherein said heat exchange conduits include heat exchange surfaces extending from the exterior of said conduits in said chamber.

10. Apparatus of claim 9 wherein said heat exchange surfaces comprise fins.

11. Apparatus of claim 9 wherein said solid adsorbent is secured adjacent the exterior of said conduits in contact with said heat exchange surfaces.

12. Apparatus of claim 1 for receiving and dispensing a polar gaseous refrigerant wherein said solid adsorbent is a complex compound of said polar gaseous refrigerant and a metal salt capable of alternately adsorbing and desorbing said polar gaseous refrigerant, said salt comprising:

a metal halide, oxide, sulfite, sulfite, nitrate, nitrite or oxalate in which the metal is an alkali metal, alkaline earth metal, transition metal, aluminum, or zinc;

a double metal salt in which the two metals are selected from strontium, sodium, aluminum, silver, gold, calcium, magnesium and cobalt;

ammonium chloride; or a double metal salt in which one metal is in an alkali or alkaline earth metal.

13. Apparatus of claim 12 wherein aid solid adsorbent is capable of adsorbing said polar gaseous refrigerant at a temperature of between about $-30°$ C. and about 60° C.

14. Apparatus of claim 1, wherein said gaseous refrigerant is ammonia and said solid adsorbent comprises $CaCl_2$, $SrCl_2$, $LiCl$, $CaBr_2$, or $SrBr_2$, and mixtures thereof.

15. Apparatus of claim 1, wherein said gaseous refrigerant is ammonia and said solid adsorbent is a complex compound of ammonia and a metal salt having an equilibrium temperature at 1 bar pressure at least 20° C. higher than the ammonia equilibrium temperature, and not greater than about 160° C.

16. Apparatus of claim 1, including a porous, inert solid material mixed with said solid adsorbent.

17. Apparatus of claim 1, wherein said gaseous refrigerant comprises a non-polar gas and said solid adsorbent comprises zeolite or activated carbon.

18. Apparatus of claim 1, wherein said gaseous refrigerant comprises hydrogen and said solid adsorbent comprises a metal hydride.

19. Apparatus of claim 3, wherein said polar refrigerant is ammonia and said salt comprises a metal halide, oxide, sulfate, sulfite, nitrate, nitrite or oxalate in which the metal is an alkali metal, alkaline earth metal, transition metal, aluminum, or zinc;

a double metal salt in which the two metals are selected from strontium, sodium, aluminum, silver, gold, calcium, magnesium and cobalt;

ammonium chloride; and a double metal salt in which one metal is an alkali or alkaline earth metal.

20. Apparatus of claim 3 wherein said salt comprises $CaCl_2$, $SrCl_2$, $LiCl$, $CaBr_2$ or $SrBr_2$, and mixtures thereof.

21. Apparatus of claim 3, wherein said vessel is capable of holding up to about 1,000 lbs. polar refrigerant.

22. Apparatus of claim 19 wherein said salt comprises $SrCl_2$ and said complex coordinated compound comprises $SrCl_2.X\ NH_3$, wherein X is between 1 and 8.

23. Apparatus of claim 3 wherein said heat exchange conduits comprises finned conduits.

24. Apparatus of claim 3, wherein said heat exchange means includes inlet manifold means for distributing water from said water inlet to said heat exchange conduits and outlet manifold means for directing water from said heat exchange conduits to said outlet.

25. Apparatus of claim 3 including a porous, inert solid material mixed with said solid adsorbent.

26. Apparatus of claim 3 including valve means cooperating with said gas inlet means for selectively directing polar refrigerant to and from said sealed chamber.

27. The method of claim 5 including closing the gas inlet means to terminate further introduction of said gas into said chamber from said refrigeration system, terminating the flow of cooling fluid into said heat exchange conduits, and thereafter selectively charging a refrigeration system with said gas comprising connecting the fluid inlet means of said apparatus to a source of heating fluid having a temperature sufficient to induce desorption of said gas from said solid adsorbent, opening the gas inlet means, directing said heating fluid through said heat exchange conduits thereby desorbing said gas from said solid adsorbent in an endothermic reaction, and directing the desorbed gas to said refrigeration system while continuing to direct heating fluid through said heat exchange conduits.

28. A method of claim 6 wherein said salt comprises $SrCl_2$ and wherein said ammonia is fed into said sealed chamber at a pressure of between about 0.2 and abot 20 atmospheres, and water is supplied to said heat exchange conduits at a temperature of between about 0° C. and about 25° C. during said adsorption.

29. A method of claim 7 wherein said polar refrigerant is desorbed from said salt using compressor suction.

30. A method of claim 7 wherein said polar refrigerant is ammonia and said ammonia is desorbed from said salt by supplying a heating fluid through said heat exchange conduits at a temperature of between about 5° C. and about 150° C. during said desorption.

31. A method of claim 30 wherein said salt in said apparatus comprises $SrCl_2$ and wherein said ammonia is desorbed by supplying water or steam through said heat exchange conduits at a temperature of between about 5° C. and about 150° C.

* * * * *